United States Patent [19]
Lorenz

[11] Patent Number: 6,107,873
[45] Date of Patent: *Aug. 22, 2000

[54] LOW NOISE COMMON-EMITTER PREAMPLIFIER FOR MAGNETO-RESISTIVE HEADS

[75] Inventor: Perry Scott Lorenz, Sunnyvale, Calif.

[73] Assignee: National Semiconductor Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/050,672

[22] Filed: Mar. 30, 1998

[51] Int. Cl.[7] .............................. H03F 3/45; H03K 17/16
[52] U.S. Cl. ............................ 327/563; 327/65; 327/73; 360/67; 330/252
[58] Field of Search .................. 360/67; 327/489, 327/563, 65, 72, 73, 68, 67; 330/252

[56] References Cited

U.S. PATENT DOCUMENTS

| | | | |
|---|---|---|---|
| 3,970,947 | 7/1976 | Sato et al. ................................. | 330/69 |
| 4,422,051 | 12/1983 | Katakura et al. ........................ | 330/254 |
| 4,574,202 | 3/1986 | Ogawa ..................................... | 327/104 |
| 4,833,346 | 5/1989 | Marple ...................................... | 327/73 |
| 5,331,478 | 7/1994 | Aranovsky .............................. | 330/252 |
| 5,337,007 | 8/1994 | Barrett, Jr. et al. ..................... | 330/253 |
| 5,742,203 | 4/1998 | Van De Plassche et al. .......... | 330/254 |
| 5,757,566 | 5/1998 | Ngo et al. ................................. | 360/67 |
| 5,841,313 | 11/1998 | Levin et al. ............................. | 327/266 |
| 5,862,091 | 1/1999 | Bion et al. ............................... | 365/207 |

Primary Examiner—Timothy P. Callahan
Assistant Examiner—Terry L. Englund
Attorney, Agent, or Firm—Skjerven, Morrill, MacPherson, Franklin, & Friel, LLP; Edward C. Kwok; Patrick D. Benedicto

[57] ABSTRACT

A preamplifier circuit couple to a magneto-resistive (MR) head used in the read circuitry of a magnetic storage device includes differential amplifiers coupled to receive an input from the MR head and to provide output signals. The preamplifier is designed to provide a low noise level. To minimize noise, transistors of the differential amplifiers provide high current gain and have large device geometries.

12 Claims, 4 Drawing Sheets

LOW NOISE COMMON-EMITTER PREAMPLIFIER FOR MAGNETO-RESISTIVE HEADS

FIELD OF THE INVENTION

The field of the invention relates to a preamplifier and more specifically to a low noise preamplifier for use in a magnetic storage device.

BACKGROUND OF THE INVENTION

Magnetic storage systems store information by magnetizing bit positions on tracks located on a surface of a magnetic media, e.g. a magnetic disk. An actuator arm supports and maintains a Magneto-Resistive (MR) head close to the magnetic disk surface to perform the read and write operations on the disk surface. As the magnetic disk is moved past the MR head, the variations in the magnetic flux passing through the MR head result in changes in the electrical resistance of the MR head.

An MR head is biased with a constant electrical current so that a voltage is present across the MR head. A preamplifier is then used to detect changes in the voltage across the MR head caused by the variations in the electrical resistance of the MR head. Changes in the voltage across the MR head are used to extract the data stored on the magnetic disk surface.

FIG. 1 illustrates preamplifier 10A with a single MR head H0, used in the read circuitry of a magnetic storage device, as known in the prior art. The preamplifier 10A measures high frequency variations in the voltage across MR head H0, a variation of approximately 1 mV peak-to-peak. The signal from MR head H0 is applied to the base terminals of transistors Q1 and Q3 which are part of two emitter-coupled differential amplifiers.

Operational amplifiers A1 and A2 bias the transistors of the differential amplifier, Q1–Q8, to operate in the linear region. Capacitors C1 and C2 filter out high frequency signals input to the base terminals of transistors Q2 and Q4.

Nodes N3 and N4 provide a differential output signal for use in an amplifier circuit not shown.

Preamplifier 10A supports 4 to 10 MR heads. FIG. 2 depicts how two MR heads H0 and H1 would be configured in preamplifier 10A. Only one MR head operates at a time. Though not depicted in FIG. 2, a circuit selects an MR head to operate. For example, for MR head H1 to operate, current sources I25 and I26 are turned on, bipolar transistors Q21 and Q23 are biased to operate in the linear region, current sources I1 and I3 are turned off, and transistors Q1 and Q3 do not operate. Transistors Q21 and Q23 essentially take the place of transistors Q1 and Q3 and thus provide inputs to differential amplifiers D1 and D2. Transistors Q2 and Q4 would still operate for transistors Q21 and Q23. Current sources I25 and I26 provide the same level of current as current sources I1 and I3.

In the design of preamplifier 10A, a low noise contribution is paramount. Noise contribution primarily includes transistor noise, which further includes base shot noise and collector shot noise and base thermal noise. Base thermal noise is related by the resistance from the base regions, $R_b$, an expression commonly known in the art. Increasing the size of transistors Q1–Q4 reduces the magnitude of $R_b$ and thus reduces the base thermal noise. Collector shot noise also contributes to transistor noise. Increasing the gain from base to collector in transistors Q1–Q4 reduces collector shot noise. However, the gain is limited because the transistors must operate in the linear region. Increasing the values of load resistors R1 and R3 increases the gain, but increasing the gain increases the current through resistors R1–R4 and thus may jeopardize linear region biasing of the transistors. Thus the gain is limited and so too is the reduction in collector shot noise. Thus the operation of preamplifier 10A is hampered by noise.

SUMMARY OF THE INVENTION

The present invention comprises a preamplifier with an acceptable level of shot noise with reference to an input MR head.

One embodiment of the present invention includes a low noise preamplifier that amplifies an input signal, the preamplifier including: a magneto-resistive input device that generates the input signal; a first circuit coupled to receive the input signal from the magneto-resistive input device, the first circuit including a first transistor, the first transistor including first, second, and third terminals, and a second transistor, the second transistor including first, second, and third terminals; a second circuit coupled to receive the input signal from the magneto-resistive input device, the second circuit including a third transistor, the third transistor including first, second, and third terminals, and a fourth transistor, the fourth transistor including first, second, and third terminals; an upper voltage supply. In this embodiment, the first terminal of the first transistor is coupled to the first terminal of the second transistor, the third terminal of the second transistor is coupled to the upper voltage supply, the first terminal of the third transistor is coupled to the first terminal of the fourth transistor, and the third terminal of the fourth transistor is coupled to the upper voltage supply.

The present invention is better understood in view of the detailed description below and the accompanying drawings.

DETAILED DESCRIPTION OF THE PREFERRED EMBODIMENTS

Figure 3:
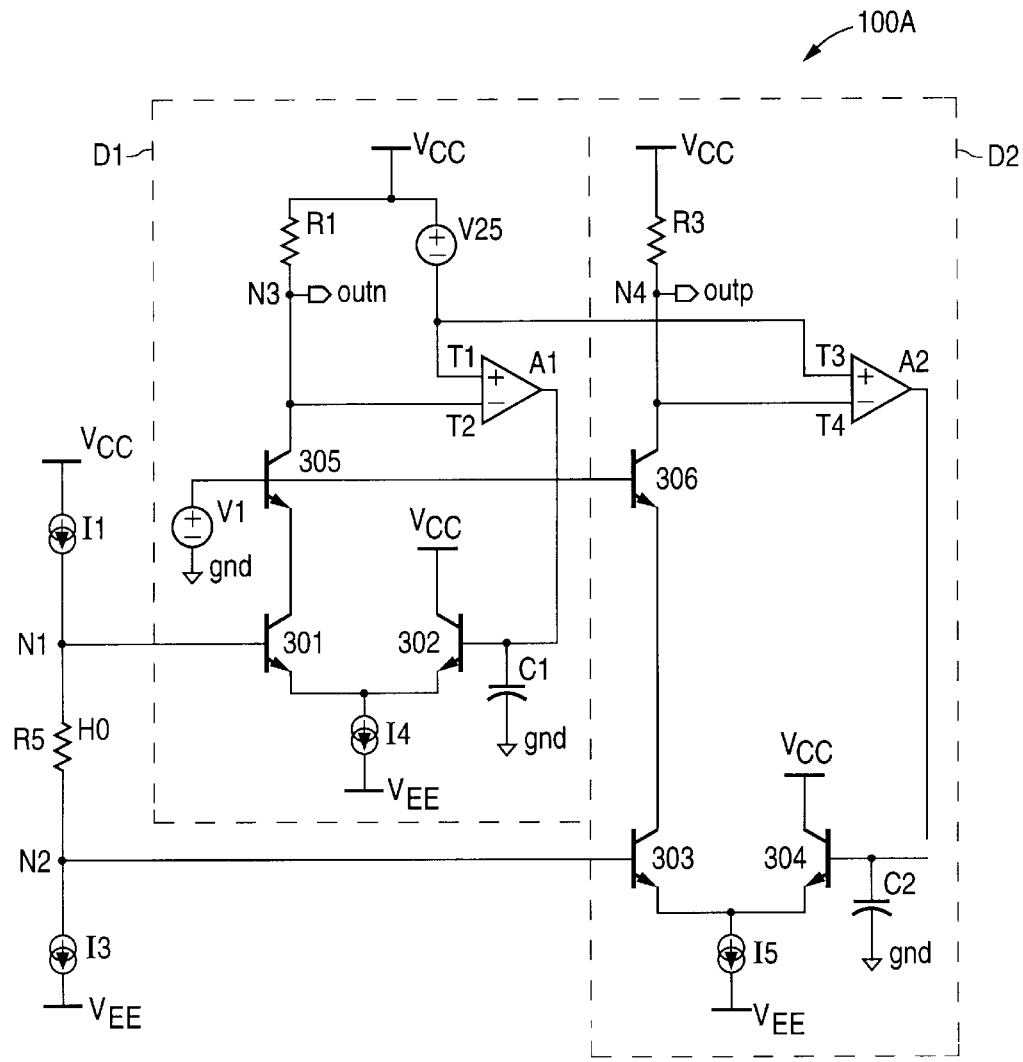
FIG. 3 illustrates an embodiment of the invention by preamplifier 100A.

FIG. 3 depicts one embodiment of the invention, preamplifier 100A. MR head H0, which reads from a magnetic disk, is coupled across resistor R5. The magnitude of resistor R5 may vary between 30 and 80 ohms. Resistor R5 is coupled across base terminals of bipolar transistors 301 and 303, inputs to differential amplifiers D1 and D2, respectively. Current sources I1 and I3 are serially coupled to resistor R5 at nodes N1 and N2, respectively, and provide current into resistor R5 and to lower voltage rail $V_{EE}$, which provides a voltage of approximately −5 V. In this embodiment, the currents provided by current sources I1 and I3 are approximately 9 mA.

Bipolar transistors 301 and 302 and bipolar transistors 303 and 304 provide inputs to a pair of differential amplifiers, D1 and D2. Base terminals of transistors 301 and 303 are coupled to nodes N1 and N2, respectively, across resistor R5. Base terminals of transistors 302 and 304 are coupled to receive output signals from operational amplifiers A1 and A2, respectively.

Operational amplifiers A1 and A2 bias transistors 302 and 304 to provide an alternating current ground at a predetermined voltage, which is set by voltage source V25. Voltage source V25 is serially coupled to terminals T1 and T3 of operational amplifiers A1 and A2 to provide a voltage of 2 V less than $V_{cc}$. $V_{cc}$ provides a voltage of 5V.

Capacitors C1 and C2 are provided to filter out high frequency signals into the base terminals of transistors 302 and 304 from the operational amplifiers A1 and A2 and to provide a low impedance path to ground. Capacitors C1 and C2 make transistors 302 and 304 behave as diodes to alternating currents. The impedance across a diode is $r_e$ of transistors 302 and 304. In this embodiment, $r_e$ is 5 ohms because the collector current is 5 mA, and thus contributes a small amount of noise.

Resistor R1 is serially coupled between $V_{cc}$ and the terminal T2 of operational amplifier A1. Resistor R3 is serially coupled between $V_{cc}$ and T4. Resistors R1 and R3 are set to allow the transistors 301 and 303 to operate in the linear region. In this embodiment, resistors R1 and R3 are approximately 400 ohms.

While preamplifier 10A and 10B of the prior art include load resistors R2 and R4, in preamplifier 100A, load resistors R2 and R4 are absent. Thereby collector currents through transistors 302 and 304 may be increased without jeopardizing linear mode operation of transistors 302 and 304. Because no load resistors are coupled between $V_{cc}$ and collector terminals of transistors 302 and 304, collector currents may be higher and thus providing a higher gain. Higher gain reduces collector shot noise and provides better signal-to-noise performance.

The absence of load resistors does not diminish the gain from base terminals of transistors 301 and 303 to nodes N3 and N4. The gain from the differential inputs to nodes N3 and N4 remain $R1/(r_{e301}+r_{e302})$ and $R3/(r_{e301}+r_{e302})$, respectively.

Collector terminals of transistors 302 and 304 are coupled to $V_{cc}$. Unlike preamplifiers 10A or 10B of the prior art, the currents through transistors 302 and 304 need not match the currents through transistors 301 and 303. The collector currents through transistors 301–304 can then be set to optimal levels. The optimal current levels are those at which the collector shot noise matches the base shot noise in each transistor, 301–304 ("optimal level"). The collector and base currents of transistor 302 are higher than those of transistor 301 because the impedance of C1 is lower than R5 and so the base shot noise developed across C1 will be lower. The collector current in transistor 302 is limited by considerations other than noise such as heat dissipation. In this embodiment, the collector currents are approximately 10 mA for transistors 302 and 304 and 5 mA for transistors 301 and 303, respectively.

The geometries of transistors 301–304 are designed to further reduce noise. Larger transistors have lower base resistances $R_b$ and consequently lower base thermal noise. In this embodiment, transistors 301 and 303 are approximately a hundred times larger than a minimum size transistor for the manufacturing technology of this embodiment. In this embodiment, transistors 302 and 304 are provided four times larger in size than transistors 301 and 303. The base resistance $R_b$ of transistors 302 and 304 is lower than in transistors 301 and 303 due to the large size of transistors 302 and 304. Consequently the base thermal noise levels of transistors 301 and 303 are lower than those of transistors 302 and 304.

Voltage source V1 is serially coupled to the base terminals of bipolar transistors 305 and 306 to provide a bias voltage of 2 V.

The emitter terminals of transistors 301 and 302 are coupled to current source I4. In this embodiment, current source I4 provides 15 mA of current. Similarly the emitter terminals of transistors 303 and 304 are coupled to current source I5 which provides 15 mA of current.

Figure 1:
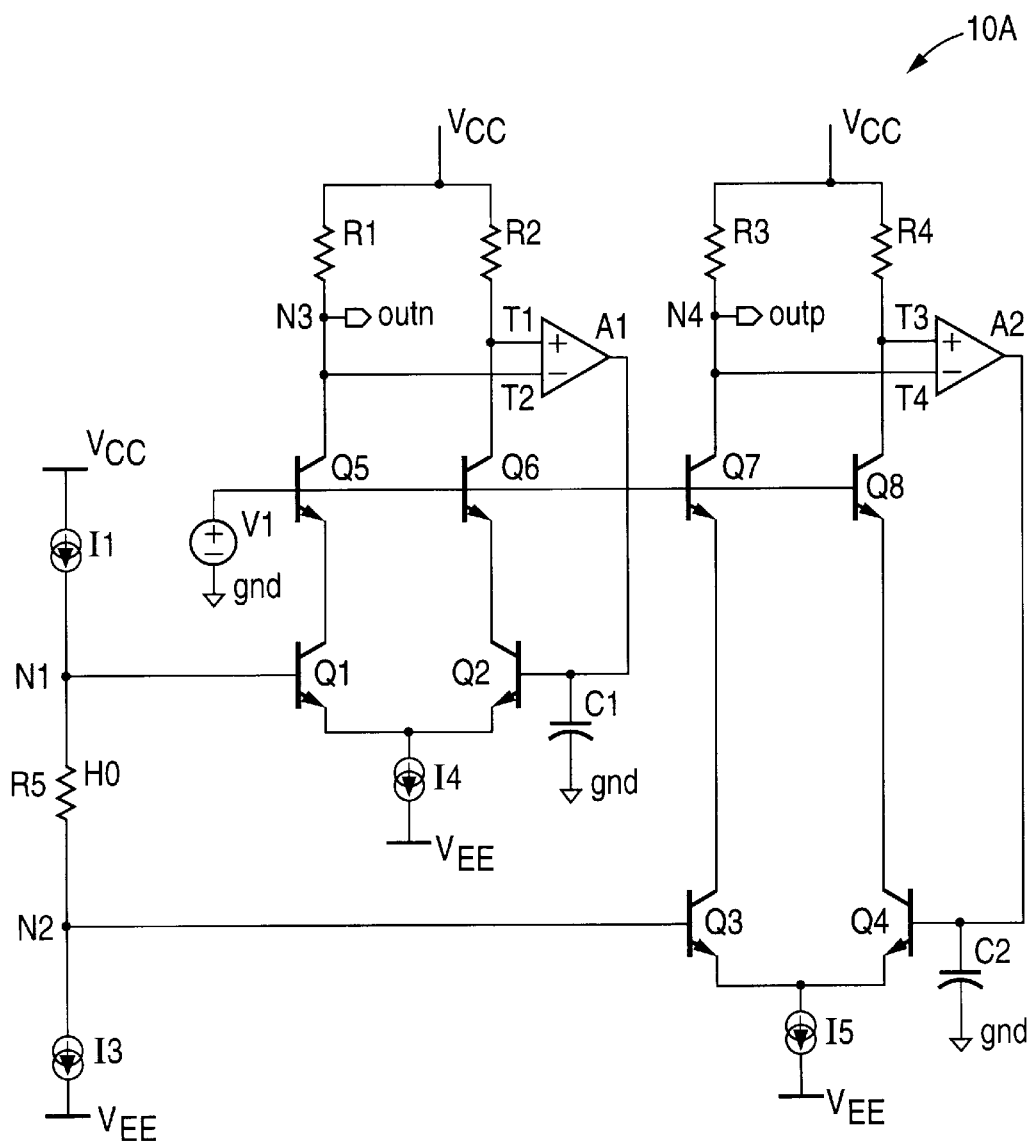
FIG. 1 illustrates a schematic diagram of preamplifier 10A, used in the read circuitry of an MR head system, as known in the prior art.
Figure 2:
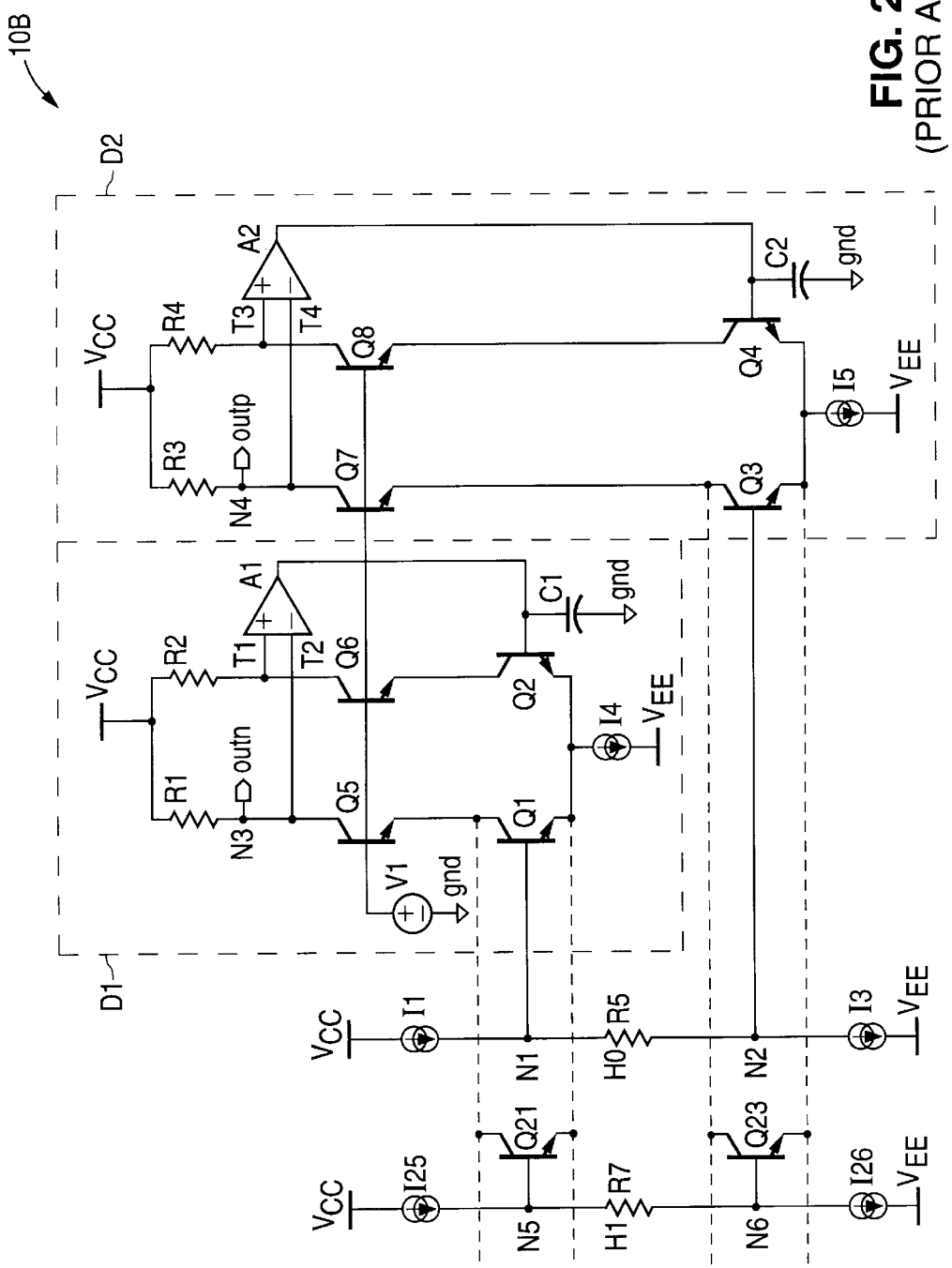
FIG. 2 illustrates preamplifier 10B of the prior art with MR heads H0 and H1.
Figure 4:
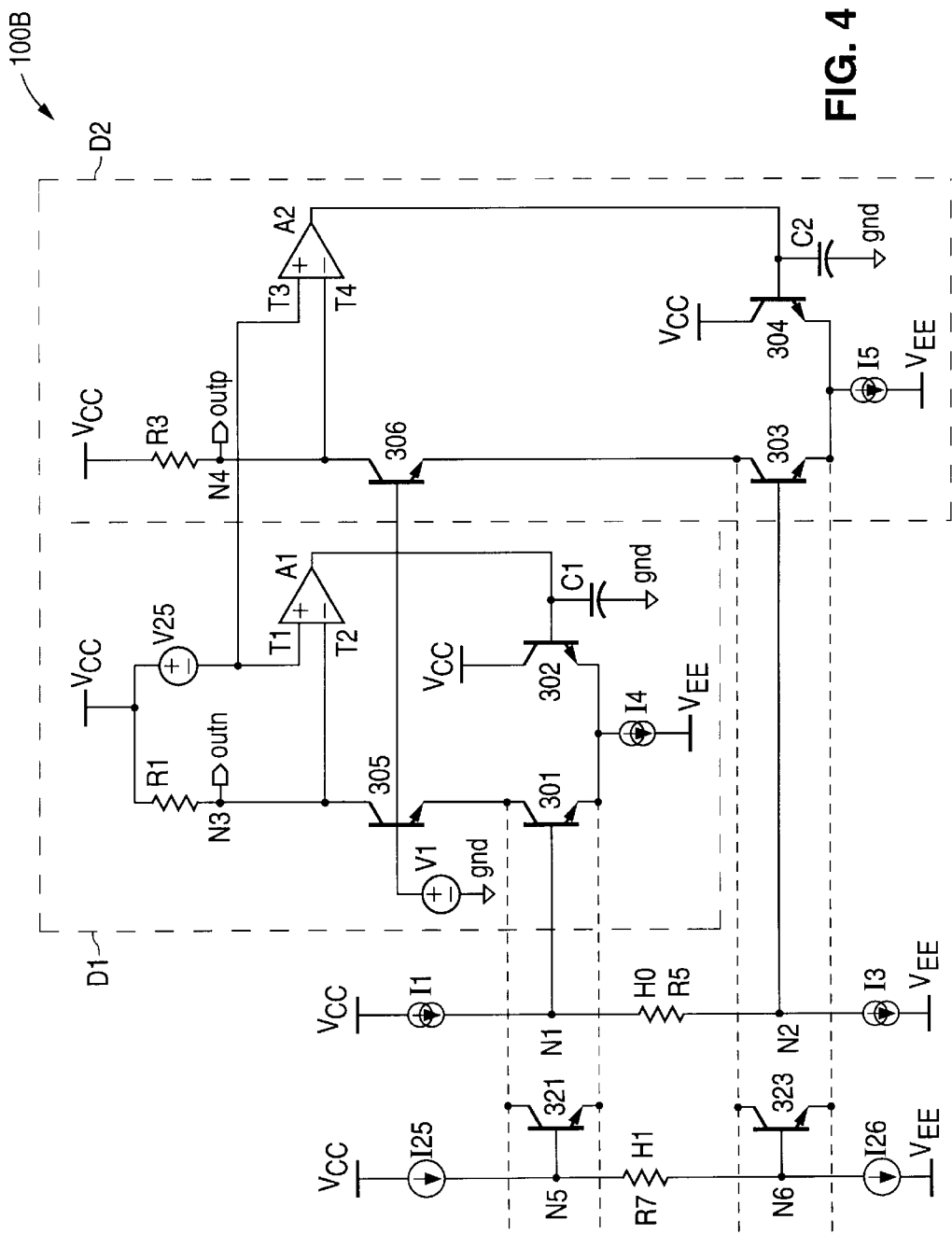
FIG. 4 illustrates an embodiment of the invention by preamplifier 100B with MR heads H0 and H1 which corresponds to the preamplifier 100A of FIG. 3 with multiple MR heads.

Preamplifier 100B of FIG. 4 can include 10 MR heads, H0 to H10, although only two MR heads, H0 and H1 are depicted. Like preamplifier 10B of FIG. 2, only one MR head operates at a time. The switching between MR heads is accomplished as described above for preamplifier 10B of FIG. 2. In a preamplifier with 10 MR heads, pairs of bipolar transistors coupled as transistors 301 and 303 are provided for each of the ten MR heads, H0–H10. For example, additional transistor pairs such as 321/323 and 331/333 would be provided for MR heads, H1 and H2, and so on. The dimensions of pairs, 321/323, 331/333, etc. are equivalent to those of 301/303 described above. Transistors 301 and 303 and other transistors coupled like transistors 301 and 303 such as transistors 321 and 323 for each of the MR heads are provided in a common core. Transistors 302 and 304 of differential amplifiers D1 and D2 would be provided only once to be shared by transistor pairs 321 and 323, etc. for additional MR heads.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A preamplifier comprising:
   (a) a first input node and a second input node across a magneto-resistive element;
   (b) a first amplifier, said first amplifier comprising:
      (i) a first transistor having a first terminal, a second terminal, and a third terminal, the second terminal of said first transistor being coupled to said first input node;
      (ii) a first impedance element having a first terminal and a second terminal, the first terminal of said first impedance element being coupled to the third terminal of said first transistor;
      (iii) a second transistor having a first terminal, a second terminal, and a third terminal, the first terminal of said second transistor being coupled to the first terminal of said first transistor;
   (c) a second amplifier, said second amplifier comprising:
      (i) a third transistor having a first terminal, a second terminal, and a third terminal, the second terminal of said third transistor being coupled to said second input node;
      (ii) a second impedance element having a first terminal and a second terminal, the first terminal of said second impedance element being coupled to the third terminal of said third transistor;
      (iii) a fourth transistor having a first terminal, a second terminal, and a third terminal, the first terminal of said fourth transistor being coupled to the first terminal of said third transistor; and
      wherein there is no substantial impedance between a power source and the respective third terminals of said second transistor and said fourth transistor.

2. A preamplifier comprising:
(a) a first input node and a second input node;
(b) a first amplifier, said first amplifier comprising:
  (i) a first transistor having a first terminal, a second terminal, and a third terminal, the second terminal of said first transistor being coupled to said first input node;
  (ii) a first impedance element having a first terminal and a second terminal, the first terminal of said first impedance element being coupled to the third terminal of said first transistor;
  (iii) a second transistor having a first terminal, a second terminal, and a third terminal, the first terminal of said second transistor being coupled to the first terminal of said first transistor;
(c) a second amplifier, said second amplifier comprising:
  (i) a third transistor having a first terminal, a second terminal, and a third terminal, the second terminal of said third transistor being coupled to said second input node;
  (ii) a second impedance element having a first terminal and a second terminal, the first terminal of said second impedance element being coupled to the third terminal of said third transistor;
  (iii) a fourth transistor having a first terminal, a second terminal, and a third terminal, the first terminal of said fourth transistor being coupled to the first terminal of said third transistor;
(d) a fifth transistor having a first terminal, a second terminal, and a third terminal, said fifth transistor being coupled between said first impedance element and said first transistor, the first terminal of said fifth transistor being coupled to the third terminal of said first transistor, the third terminal of said fifth transistor being coupled to the first terminal of said first impedance element; and
  wherein there is no substantial impedance between a power source and the respective third terminals of said second transistor and said fourth transistor.

3. The preamplifier of claim 2 wherein the size of said second transistor is larger than the size of said first transistor.

4. The preamplifier of claim 2 wherein the size of said second transistor is about four times larger than the size of said first transistor.

5. The preamplifier of claim 2 wherein the size of said fourth transistor is larger than the size of said third transistor.

6. The preamplifier of claim 2 wherein the size of said fourth transistor is about four times larger than the size of said third transistor.

7. The preamplifier of claim 2 wherein a current through the third terminal of said first transistor is at a level wherein shot noise levels at the third terminal of said first transistor and the second terminal of said first transistor are about the same.

8. The preamplifier of claim 2 wherein current through the third terminal of said third transistor is at a level wherein shot noise levels at the third terminal of said third transistor and the second terminal of said third transistor are about the same.

9. The preamplifier of claim 2 wherein a biasing current through the third terminal of said second transistor is about two times larger than a biasing current through the third terminal of said first transistor.

10. The preamplifier of claim 2 wherein a biasing current through the third terminal of said fourth transistor is about two times larger than a biasing current through the third terminal of said third transistor.

11. The preamplifier of claim 2, further comprising:
  a first power supply coupled to the second terminal of said first impedance element;
  a voltage reference having a first terminal and a second terminal, the first terminal of said voltage reference being coupled to said first power supply;
  a first operational amplifier having an output terminal, a first input terminal, and a second input terminal, the first input terminal of said first operational amplifier being coupled to the second terminal of said voltage reference, the second input terminal of said first operational amplifier being coupled to the third terminal of said fifth transistor, the output terminal of said first operational amplifier being coupled to the second terminal of said second transistor.

12. The preamplifier of claim 11, further comprising:
  a sixth transistor having a first terminal, a second terminal, and a third terminal, said sixth transistor being coupled between said second impedance element and said third transistor, the first terminal of said sixth transistor being coupled to the third terminal of said third transistor, the third terminal of said sixth transistor being coupled to the first terminal of said second impedance element;
  a second operational amplifier having an output terminal, a first input terminal, and a second input terminal, the first input terminal of said second operational amplifier being coupled to the second terminal of said voltage reference, the second input terminal of said second operational amplifier being coupled to the third terminal of said sixth transistor, the output terminal of said second operational amplifier being coupled to the second terminal of said fourth transistor.

* * * * *